United States Patent [19] [11] 4,162,002
Dubiel et al. [45] Jul. 24, 1979

[54] FRICTION CLUTCH

[75] Inventors: Oswald Dubiel; Dieter Pretzel, both of Bühl, Fed. Rep. of Germany

[73] Assignee: LuK Lammen und Kupplungsbau GmbH, Bühl, Fed. Rep. of Germany

[21] Appl. No.: 836,974

[22] Filed: Sep. 27, 1977

[30] Foreign Application Priority Data

Sep. 29, 1976 [DE] Fed. Rep. of Germany ....... 2643863

[51] Int. Cl.² ............................................. F16D 23/00
[52] U.S. Cl. .................... 192/99 A; 192/89 B; 192/70.3
[58] Field of Search ................. 192/99 A, 70.29, 70.3, 192/70.25, 70.27, 89 B, 98, 48.9, 48.91, 93 B, 70.24

[56] References Cited

U.S. PATENT DOCUMENTS

| 1,825,979 | 10/1931 | Reed | 192/70.3 |
| 2,168,960 | 8/1939 | Morris | 192/99 A |
| 2,453,945 | 11/1948 | Spase | 192/70.24 |
| 2,993,573 | 7/1961 | Carlin et al. | 192/99 A |
| 3,254,747 | 6/1966 | Werner | 192/98 |

FOREIGN PATENT DOCUMENTS

| 1103690 | 3/1961 | Fed. Rep. of Germany | 192/89 B |
| 988673 | 4/1965 | United Kingdom | 192/89 B |

Primary Examiner—Benjamin W. Wyche
Assistant Examiner—David Reichard
Attorney, Agent, or Firm—Herbert L. Lerner

[57] ABSTRACT

In a friction clutch having a housing and levers mounted on the housing for actuating at least one pressure plate, the levers engaging the pressure plate through a connecting linkage, the levers being formed of at least two sheet metal members and at least two connecting members firmly linking the sheetmetal members to one another, the levers being disposed radially to the housing and carrying, in vicinity of the inner radial end thereof and between the sheetmetal members thereat, a run-up member responsive to the action of an actuating member for actuating the pressure plate.

18 Claims, 7 Drawing Figures

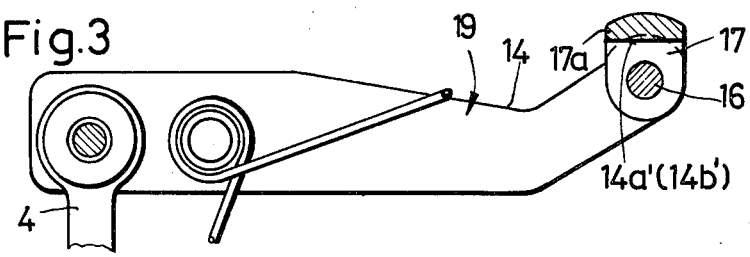
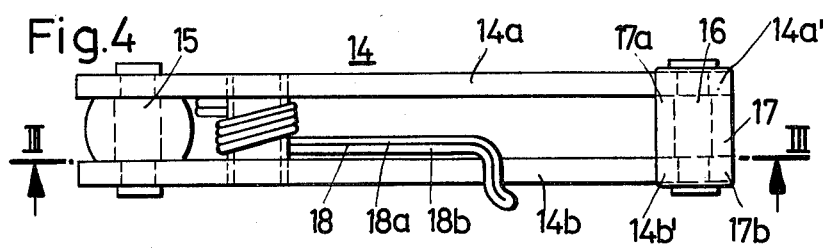
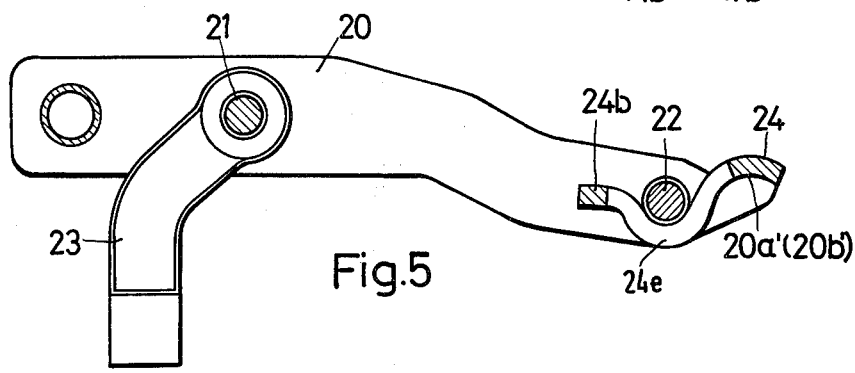
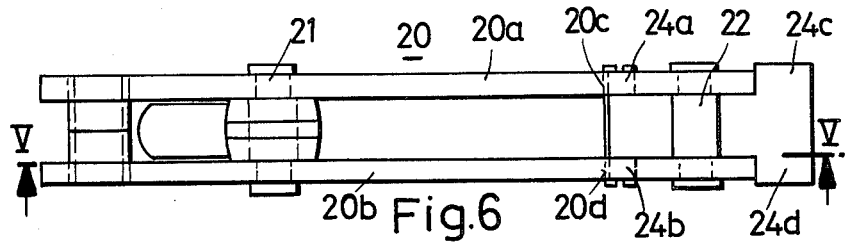
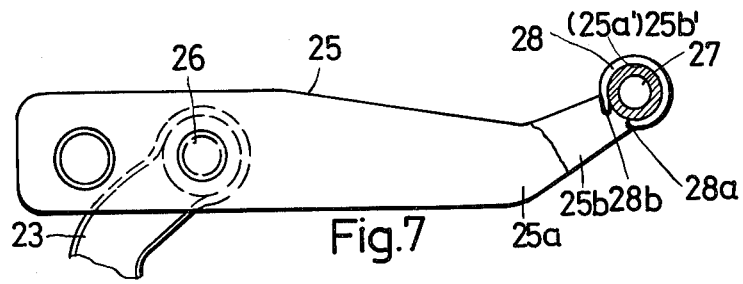

FRICTION CLUTCH

The invention relates to a friction clutch and, more particularly, a friction clutch for motor vehicles wherein, for actuating at least one pressure plate, levers are provided which are mounted on the housing and engage the pressure plate by means of a connecting linkage.

Friction clutches have already become known heretofore, wherein levers are used which are pressed from sheetmetal and have an approximately U-shaped cross section. Such levers have the disadvantage, however, that they are very expensive to manufacture, because complex tools are required. Such levers also have the further disadvantage that the supports as well as the engagement or run-up surfaces for the pressure member or the disengaging bearing must be additionally hardened, which causes distortion that can result in jamming of the levers in the bearing or of the actuating elements, as well as in excessive wear resulting from the oblique or inclined position.

It is accordingly an object of the invention to provide a friction clutch of the foregoing type which avoids these disadvantages and to provide such a friction clutch with levers formed of sheetmetal which are relatively easily and simply and, therefore, also inexpensively producible, are reliable in operation and are distinguished by extreme wear-resistance.

With the foregoing and other objects in view, there is provided, in accordance with the invention, in a friction clutch having a housing and levers mounted on the housing for actuating at least one pressure plate, the levers engaging the pressure plate through a connecting linkage, the levers being formed of at least two sheetmetal members and at least two connecting members firmly linking the sheetmetal members to one another, the levers being disposed radially to the housing and carrying, in vicinity of the inner radial end thereof and between the sheetmetal members thereat, a run-up member responsive to the action of an actuating member for actuating the pressure plate. In an especially advantageous and simple manner, a small but also extremely hard run-up member is employable, while inexpensive materials with sufficient toughness and bending strength can be employed for the levers per se.

Since the run-up members can be made extremely small and therefor require extremely little material, optimally suited materials can therefore be employed without excessive cost, but with the assurance of optimal wear properties.

Thus, in accordance with alternative features of the invention, the run-up member has a greater hardness than that of the sheetmetal members over the entire cross section of the run-up member, the run-up member has a greater hardness than that of the sheetmetal members at the surface of the run-up member where it faces the actuating member such as a disengaging bearing, or the run-up member is hardened all the way therethrough.

Further in accordance with other alternative features of the invention, the run-up member is case-hardened, or surface-hardened.

In accordance with additional alternative features of the invention, the run-up member is formed of sintered material, is formed at least partly of ceramic material, is an extrusion, is formed at least partly of hard metal or is formed at least partly of metal selected from the group consisting of chromium, molybdenum and tungsten. Thus it may be chrome-plated or especially hard-chrome plated.

In accordance with another feature of the invention, the levers are an assembly of two plate-shaped side walls.

In accordance with a further feature of the invention, the side walls are two substantially flat sheetmetal members extending in a plane perpendicular to the rotational plane of the clutch.

In accordance with a further feature of the invention, the run-up member is a roller rotatably mounted between the sheetmetal members.

In accordance with yet another feature of the invention, the run-up member is of T-shaped construction including two beam parts overlapping end regions of the sheetmetal members, and riveted through the foot member of the T to the side plates.

In accordance with yet a further feature of the invention, the run-up member is a formed sheetmetal part.

In accordance with yet an added feature of the invention, the formed sheetmetal part has at least two extensions with which it passes through the sheetmetal members of the levers.

In accordance with yet an added feature of the invention, the formed sheetmetal part has an extension extending out of an intermediate space between the sheetmetal members, the formed sheetmetal part bearing with the extension on the sheetmetal members.

In accordance with another feature of the invention, extensions passing through the sheetmetal members have either a wedged or peened-over or riveted connection therewith.

In accordance with a further feature of the invention, the formed sheetmetal part has a substantially sinuous cross section, for example, in the shape of an S or Z, and is formed with a loop which closely follows the periphery of a rivet connecting both of the sheetmetal members. A further fastening location can be formed by the hereinaforementioned extensions which penetrate the sheet metal side plates or by the hereinaforementioned extensions with which the formed sheetmetal member extends from the space between the side plates of the lever and rests on the end regions.

In accordance with an added feature of the invention, the run-up member is a shell-like sinuous part clampingly engaging about end portions of the sheetmetal members and is, for example, a type of clamping sleeve which is fastenable to the ends of the sheetmetal plates by being snapped in or slid on and held there by the clamping force thereof.

According to a further feature of the invention, in friction clutches that are operated by levers, a spring clip which loads or stresses the disengaging lever system in disengaging direction and serves to prevent the levers from wandering or traveling outwardly under the action of centrifugal force, are disposed between the two lever side plates, a simple and inexpensive construction of these springs being provided. Stress peaks occurring in this spring can be avoided in a particularly simple manner if the spring is constructed as a two-wire spring clip in accordance with the invention. The wires lie close together in accordance with yet another feature of the invention.

In accordance with a concomitant feature of the invention, the sheetmetal members receive therebetween a bearing block or pillow block provided on the housing for a pivot bearing for the sheetmetal members. Then, only a single bearing or pillow block is required to be provided for each lever.

Other features which are considered as characteristic for the invention are set forth in the appended claims.

Although the invention is illustrated and described herein as embodied in a friction clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

FIGS. 3 and 4, on the one hand, as well as FIGS. 5 and 6, on the other hand, are views of two additional embodiments of the invention, FIG. 3 being a cross-sectional view of FIG. 4 taken along the line III—III in the direction of the arrows, and FIG. 5 being a cross-sectional view of FIG. 6 taken along the line V—V in the direction of the arrows; and FIG. 7 is a view of yet another embodiment of the clutch lever of the invention.

Figure 1:
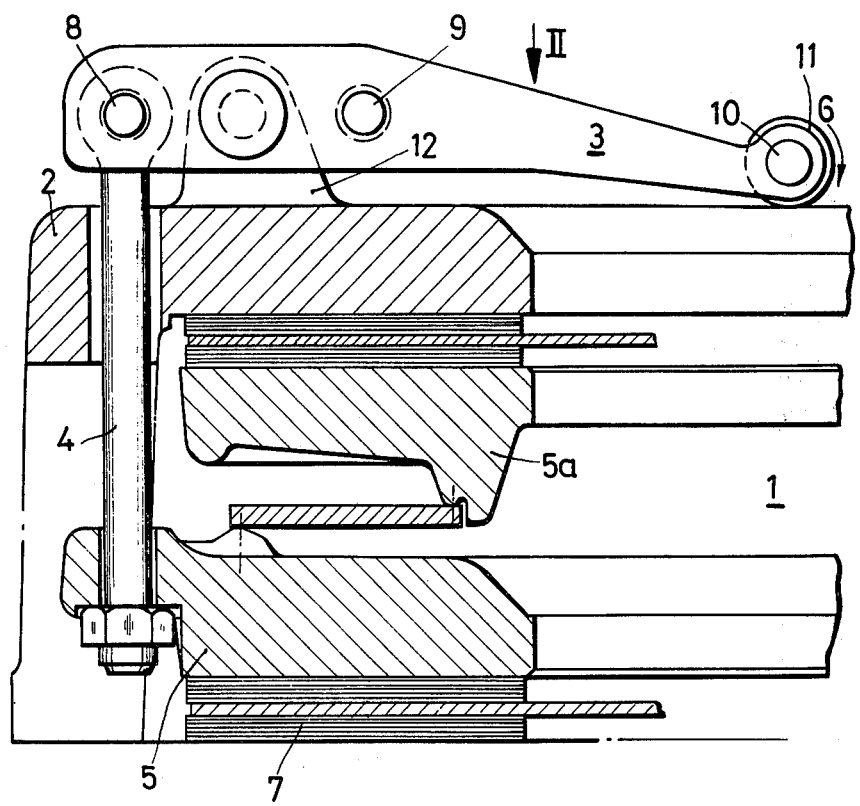
FIG. 1 is a fragmentary view of a friction clutch partly shown in cross section.

Referring now to the drawing and first, particularly, to FIG. 1 thereof, there is shown a friction clutch 1, partially and in cross section, including a lever 3 which is pivotally mounted on a housing 2 and connected through a connecting linkage 4 to a pressure plate 5. To disengage the corresponding clutch or to lift the pressure plate 5, the lever 3 is swung by a pressure member or a disengaging bearing in direction of the arrow 6, and the pressure plate 5 is thereby lifted from the associated clutch disk 7.

Figure 2:
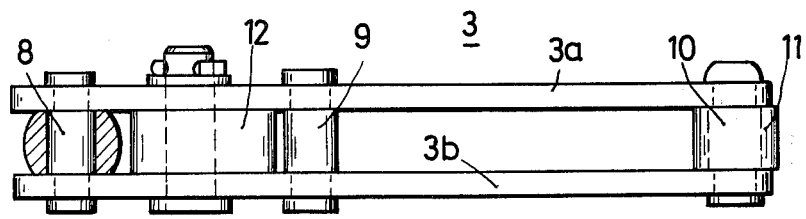
FIG. 2 is a fragmentary view of FIG. 1 as seen in direction of the arrow II therein and showing the lever of the clutch.

The lever 3, as shown in FIG. 2, is formed of two sheetmetal side plates or walls 3a and 3b which are flat stamped parts and extend perpendicularly to the plane of rotation of the clutch. These sheetmetal levers can be produced particularly simply by a stamping operation with one and the same tool, and relatively inexpensive material having adequate toughness and bending strength can be used therefor. The two lever side plates 3a and 3b are riveted together in the embodiment of FIGS. 1 and 2 by three shoulder rivets 8, 9 and 10, the shoulder rivet 8 serving as the fulcrum or pivot for the linkage or tie rod 4, and the shoulder rivet 10 receiving a run-up member or roller 11 which is supported, rotatably, if desired, on the rivet 10 between the ends 3a', 3b' of the side plates, for actuation, for example, by a non-illustrated disengaging bearing.

The roller 11, being relatively small and therefore requiring little material, can be made entirely or in part of an optimally suitable material, especially a wear-resistant material, or can be treated appropriately, for example, by hardening.

The bearing location 12, which has the form of a pillow block, is provided between the two lever side plates 3a and 3b.

The lever 14 according to FIGS. 3 and 4 likewise is formed of two smooth sheetmetal side plates 14a and 14b which are connected to each other by two shoulder rivets 15 and 16. The rivet 15 again serves as bearing for a tie rod 4, while the rivet 16 serves for holding a run-up or contact member 17. This contact member 17 has a T-shaped cross section and extends, with the cantilever arms 17a and 17b, beyond the two side plates 14a and 14b or rests on the ends 14a' and 14b' of the side plates. The rivet 16 extends through the base or foot of the T-shaped contact member.

A spring clip 18 is provided between the two sheet metal side plates 14a and 14b and exerts a force in direction of the arrow 19, whereby the lever linkage is subjected to tension and the lever is prevented from wandering or traveling outwardly under the influence of centrifugal force. In the embodiment of FIGS. 3 and 4, the spring 18 is constructed in the form of a loop and is made up of two wires 18a and 18b.

The T-shaped contact member 17 can be an extruded part, a sintered part, an investment casting, a forging or the like and can contain ceramic material, hard metal, chromium, tungsten, carbide, molybdenum or other wear-resistant materials, over the entire cross section, on the surface or distributed over the cross section, or can be hardened all the way through, case hardened, or surface-hardened, for example, by gas nitriding.

The lever 20 in FIGS. 5 and 6 is formed again of two smooth sheetmetal side plates 20a and 20b which are connected to one another by rivets 21 and 22. The rivet 21 simultaneously serves as the pivot bearing for a plunger 23, through which the pressure plate 5a shown in FIG. 1 can be disengaged in a conventional manner not otherwise shown in detail.

A sheetmetal member 24 formed in S-fashion is held as run-up or contact member at the end of the sheetmetal side plates 20a and 20b between the latter, and, in fact, by providing that extensions 24a and 24b formed on the sheetmetal member 24 pass, on the one hand, through cutouts or recesses 20c and 20d formed in the side plates 20a and 20b which are wedged against the extensions 24a and 24b, and that the formed sheetmetal member 24, furthermore, has extensions 24c and 24d, with which it bears on the end regions 20a' and 20b'. Furthermore, the S-shaped sheetmetal member 24, with the loop-shaped region 24e thereof, closely follows or is clamped to the pin 22.

The formed sheet metal member 24 provides a similarly especially inexpensive construction having optimal strength, since this relatively small part can be hardened especially inexpensively, for example, by gas nitriding.

FIG. 7 shows a further embodiment of a lever 25 also of smooth sheetmetal side plates 25a and 25b, of which the side plate 25a is shown in cross section in the forward part thereof i.e. at the right-hand side of the figure. Two rivets 26 and 27 hold the two sheetmetal side plates 25a and 25b firmly together, and the plunger 23 is pivoted, as in FIG. 5, by means of the one rivet 26. The rivet 27 and the ends 25a' and 25b' of the lever side plates 25a and 25b are constructed with the same outline or contour at least over more than 90°. A rolled sheetmetal run-up member 28, which can be constructed like a split taper sleeve, encloses these outlines or contours as well as the rivet 27. Between the two side plates 25a and 25b, the sleeve member 28 has two formed-on extensions 28a and 28b which are directed toward one another and which engage around the rivet 27, ensuring that the member 28 is held firmly at the ends of the lever. The member 28 may be formed of spring steel or similar hard metal.

There are claimed:

1. Friction clutch having a housing and levers mounted on the housing for actuating at least one pressure plate, the levers engaging the pressure plate through a connecting linkage, the levers being formed of at least two sheetmetal members and at least two connecting members firmly linking said sheetmetal members to one another, the levers being disposed radially to the housing and carrying, in vicinity of the inner radial end thereof and between said sheetmetal members thereat, a run-up member responsive to the action of an actuating member for actuating the pressure plate, said run-up member being of T-shaped construction including two beam parts overlapping end regions of said sheetmetal members.

2. Friction clutch according to claim 1 wherein said levers are an assembly of two plate-shaped side walls.

3. Friction clutch according to claim 2 wherein said side walls are two substantially flat sheet metal members extending in a plane perpendicular to the rotational plane of the clutch.

4. Friction clutch according to claim 1 wherein said run-up member has a greater hardness than that of said sheetmetal members over the entire cross section of said run-up member.

5. Friction clutch according to claim 1 wherein said run-up member has a greater hardness than that of said sheetmetal members at the surface of said run-up member.

6. Friction clutch according to claim 4 wherein said run-up member is hardened all the way therethrough.

7. Friction clutch according to claim 4 wherein said run-up member is case-hardened.

8. Friction clutch according to claim 5 wherein said run-up member is surface-hardened.

9. Friction clutch according to claim 1 wherein said run-up member is formed of sintered material.

10. Friction clutch according to claim 1 wherein said run-up member is formed at least partly of ceramic material.

11. Friction clutch according to claim 1 wherein said run-up member is an extrusion.

12. Friction clutch according to claim 1 wherein said run-up member is formed at least partly of hard metal.

13. Friction clutch according to claim 1 wherein said run-up member is formed at least partly of metal selected from the group consisting of chromium, molybdenum and tungsten.

14. Friction clutch according to claim 1 including means for riveting said run-up member between said sheetmetal members.

15. Friction clutch having a housing and levers mounted on the housing for actuating at least one pressure plate, the levers engaging the pressure plate through a connecting linkage, the levers being formed of at least two sheetmetal members and at least two connecting members firmly linking said sheetmetal members to one another, the levers being disposed radially to the housing and carrying, in vicinity of the inner radial end thereof and between said sheetmetal members thereat, a run-up member responsive to the action of an actuating member for actuating the pressure plate and spring clip means for applying a force to said lever in disengaging direction, said spring clip means being disposed, at least for the most part, between both of said sheetmetal members.

16. Friction clutch according to claim 1 wherein said spring clip means are formed of two wires.

17. Friction clutch according to claim 16 wherein said two wires are disposed closely adjacent one another.

18. Friction clutch according to claim 1 wherein said sheetmetal members receive therebetween a bearing block provided on the housing for a pivot bearing for said sheetmetal members.

* * * * *